United States Patent [19]

Iwazawa

[11] Patent Number: 5,995,482
[45] Date of Patent: Nov. 30, 1999

[54] DISK SUPPORTING DEVICE CAPABLE OF HOLDING A DISK IN A CARTRIDGE WITH A RELEASABLE, PIVOTABLE LEVER ARM

[75] Inventor: Naotoshi Iwazawa, Tokyo, Japan

[73] Assignee: NEC Corporation, Tokyo, Japan

[21] Appl. No.: 09/008,324

[22] Filed: Jan. 20, 1998

[30] Foreign Application Priority Data

Jan. 22, 1997 [JP] Japan ..................................... 9-009654

[51] Int. Cl.⁶ ....................................................... G11B 3/70
[52] U.S. Cl. ............................................. 369/291; 369/261
[58] Field of Search ..................................... 369/291, 215, 369/261; 360/133

[56] References Cited

U.S. PATENT DOCUMENTS 4,802,047  1/1989  Tanaka et al. ...................... 369/291 X

FOREIGN PATENT DOCUMENTS

| 61-163378 | 10/1986 | Japan . |
| 62-101170 | 6/1987 | Japan . |
| 63-34779 | 2/1988 | Japan . |
| 63-164863 | 10/1988 | Japan . |
| 63-317994 | 12/1988 | Japan . |
| 64-19572 | 1/1989 | Japan . |
| 5-15178 | 2/1993 | Japan . |

*Primary Examiner*—Michael Tokar
*Assistant Examiner*—Patrick Wamsley
*Attorney, Agent, or Firm*—Young & Thompson

[57] ABSTRACT

A disk supporting device has a spacer member which is placed close to the rim of a disk stored within a cartridge, and gently holds the rim of disk while the apparatus is put out of use; and a spacer releasing mechanism which, when the apparatus is put to use, is activated by a lever for opening/closing a shutter placed outside the cartridge, to displace the spacer member away from the disk in a radial direction of disk to separate the former from the latter. Further, the spacer member is so formed as to have a groove in the form of a rectangular indent on a side opposite to the disk for holding the latter. Through this constitution it is possible to obtain a disk supporting device which does not change its position with respect to the cartridge base whether the apparatus is put to use or out of use, and to produce a cartridge on the whole uniformly thin and allowing a good productivity.

7 Claims, 7 Drawing Sheets

DIRECTION OF
CARTRIDGE INSERTION

DIRECTION OF CARTRIDGE INSERTION

DISK SUPPORTING DEVICE CAPABLE OF HOLDING A DISK IN A CARTRIDGE WITH A RELEASABLE, PIVOTABLE LEVER ARM

BACKGROUND OF THE INVENTION

1. Field of the Invention

The present invention relates to a disk supporting device, particularly to a disk supporting device capable of holding, for a disk cartridge to be applied to an optical disk apparatus, the disk effectively within the cartridge while the apparatus remains out of use.

2. Related Art

As a case to store a disk or a memorizing medium of an optical disk apparatus, a cartridge has been used to prevent the information surface of the disk from being soiled during handling.

The cartridge is constructed such that a clearance is placed between a disk and cartridge to prevent the disk, when rotating, from contacting with the stationary cartridge. This clearance is insured by an elevating mechanism of a spindle motor which adjusts the height of disk. While the apparatus is switched off, the spindle motor is removed from the disk, and thus the disk falls from gravity to settle at a position where it contacts with the cartridge.

As described above, as the height of disk changes according to whether the apparatus is put into action or is kept out of action, interactions of the disk with other components pose a problem.

More particularly, an interaction with an optical head forms one of such problems.

The optical head must be close to the disk when in use, but it must be kept at a low position when out of use by some means, because the optical head would interfere with the stable positioning of disk when the apparatus is out of use, as long as it remains at a position where it can contact with the cartridge.

As an example of a cartridge capable of supporting a disk therein during switching-off of the apparatus, the cartridge disclosed in Japanese Unexamined Patent Publication No. 64-19572 may be cited which is represented by FIGS. 8 and 9.

With the conventional apparatus as represented in FIGS. 8 and 9, a disk 52 is pushed by one end of a blade 53 which is rotatably placed around a central pivot 61 in a cartridge 51 so that the disk is immobilized being pressed against the inner wall 51B of cartridge which has an annular form. A means to enhance the pressing force is represented by a spring 60. A mark 54 represents a guide slit, and another mark 54a a guide pin. A third mark 55 represents a pressing roller.

During operation, when a shutter 56 is opened, a pin 56a fixed to the shutter 56 engages with a groove 53a of the blade 53 on the opposite end to the pressing end, thereby to spin the blade 53 and to release the disk from the state of being immobilized.

As seen from this example, many of the conventional disk holding devices aim mainly at protecting the disk from external mechanical shocks during switching-off, and consist simply of immobilizing a disk by pressing its outer rim against some hard thing.

Namely, the conventional device as represented by FIGS. 8 and 9 mainly aims at preventing the read/write performance of a disk from being degraded as a result of damages due to vibrations, or from adherence of dusts onto the disk surface, while the cartridge is being carried from one place to another by hand. Thus, the conventional device is not produced after a due attention has been paid to thinning of the device as a whole.

To develop a new disk device, it is most important to pay close attention to making the device as small and thin as possible so that it has an excellent portability. Thus, it has been desired to make a clearance between the optical head and disk in the cartridge as small as possible when the cartridge is loaded.

The relative position between a cartridge base 51A and a disk 52 of a conventional apparatus is shown for both cases where the apparatus is put to use (FIG. 10A), and the apparatus is put out of use (FIG. 10B).

With the conventional cartridge 51 here concerned, a disk 52 takes a position "a" as represented in FIG. 10A so that a predetermined clearance is insured between the level at which the disk will rotate and the cartridge base 51A in order to ensure smooth rotation of the disk 52. On the other hand, the disk 52 takes a position "b" as represented in FIG. 10B when the apparatus is put out of use. Then, if an optical head takes a position as represented in FIG. 10B, and the cartridge 51 is loaded, the disk will be displaced towards right from the position "b", and hit against the optical head 60.

To prevent this inconvenience, when the cartridge is inserted, it is necessary to lower the optical head 60 sufficiently so that the head may not contact with the disk 52. This makes it necessary to add an extra thickness to the height of cartridge (to accommodate the lowering of head). Further, ascending or descending the optical head unnecessarily frequently makes an optical head supporting mechanism vulnerable to long use and worsens its endurance.

The distance between the optical head (not illustrated here) and disk 52 is determined by the focusing distance of lens. As the disk has a larger capacity and achieves a higher density recording, the focusing distance of lens will become shorter, and the distance between the optical head 60 and disk 52 will be smaller. Therefore, because the clearance is close in magnitude to the focusing distance of optical head, an interaction between the disk and optical head will arise when the cartridge is loaded as long as the disk takes the position "b" as shown in FIG. 10B.

SUMMARY OF THE INVENTION

To overcome inconveniences inherent to conventional products as seen above, this invention intends to provide a disk supporting device which enables a disk to be immobilized relative to the cartridge base whether the apparatus is being put to use or out of use, and thus makes it possible for the cartridge to be made thin and improves the productivity of cartridge as a whole.

The disk supporting device of this invention is represented by a disk supporting device stored in a cartridge which comprises:

a spacer member which is placed close to the rim a disk kept in place within the cartridge, and gently holds the rim when the apparatus is put out of use; and a spacer releasing mechanism which, when the apparatus is put to use, is put into action being activated by a lever to open/close a shutter which is outside the cartridge, and moves the spacer member in a radial direction of the disk such that the space member is displaced away from the disk to achieve a complete separation, with the spacer member having a disk holding surface which takes a form of a rectangular indent in profile.

By virtue of this composition, according to this invention, as shown in FIG. 1, when a cartridge 1 is inserted into a body of an apparatus, during insertion, the lever 4 to open/close the shutter is activated, and puts the spacer releasing mechanism 10 into action. Through this action, at the same time when the shutter 6 is opened, the spacer releasing mechanism 10 is activated, and allows the spacer member 3 to retreat from the disk.

When operation of the body of apparatus is completed and switched off, the cartridge 1 is taken out from the body of apparatus. During this operation, the spacer releasing mechanism is activated to allow the spacer member 3 to resume the original position as represented by FIG. 1. Through this action, the disk 2 is stably immobilized again by the spacer member 3 while keeping a position ready for rotation.

This device of this invention is composed, as described above, in such a way as to allow the spacer member to be displaced through the action of pivot lever, and thus even when the spacer member is kept apart from the shutter lever, it is allowed to maintain its function effectively, that is, to hold the disk stably at the same position whether the apparatus is put to use or out of use.

The disk supporting device of this invention comprises:

a pivot lever through which the spacer releasing mechanism engages with the spacer member to displace the latter away from the disk;

a shutter bar which transmits a driving force from the lever for shutter opening/closure to the pivot lever; and an original position recovering spring which is connected to the pivot lever.

Through this composition, the device of this invention not only satisfies the functions met by the conventional machine as described above but achieves extra functions through a concerted action of the components as specified below. Turn to FIG. 1 for reference. At first when the cartridge 1 is inserted into the body of apparatus, during operation, the lever 4 for shutter opening/closure is activated, to put a shutter 6 and the spacer releasing mechanism 10 into action. Through this action, at the same time when the shutter 6 is opened, the shutter bar 12 of spacer releasing mechanism 10 is activated to spin the aforementioned pivot lever 11 thereby to allow the spacer member 3 to retreat from the disk.

When operation of the body of apparatus is completed and switched off, the cartridge 1 is taken out from the body. Then, at the same time when the shutter bar 12 starts to retreat, the original position recovering spring 13 described above is put into action, to allow the spacer member 3 to return to the original position as represented by FIG. 1. Through this action, the disk 2 is stably immobilized again by the spacer member 3 at a position ready for rotation.

A magnetic head supporting device of this invention comprises:

a spacer holding member in which a spacer releasing mechanism holds the spacer member by engaging with the latter;

a guide member which guides the spacer holding member to move in a radial direction of disk when the same member is displaced away from the disk;

a shutter bar which transmits a driving force from a lever for shutter opening/closure to the spacer holding member; and an original position recovering spring which is connected to the spacer holding member.

Through this composition, the device of this invention is characterized in that generally it achieves functions similar to those available to the device disclosed above, and further has a simplified structure.

Through these merits, this invention can provide a disk supporting device capable of functioning as well as the aforementioned disk supporting device, and further achieving a smooth support of disk while the apparatus is put out of use.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows read in conjunction with the accompanying drawings, wherein:

FIG. 10A shows how the disk takes a position a when the apparatus is put to use, while FIG. 10B shows how the disk takes another position b when the apparatus is put out of use.

DESCRIPTION OF THE PREFERRED EMBODIMENTS

Example 1

A first example of this invention will be described below with reference to FIGS. 1 to 5.

Figure 1:
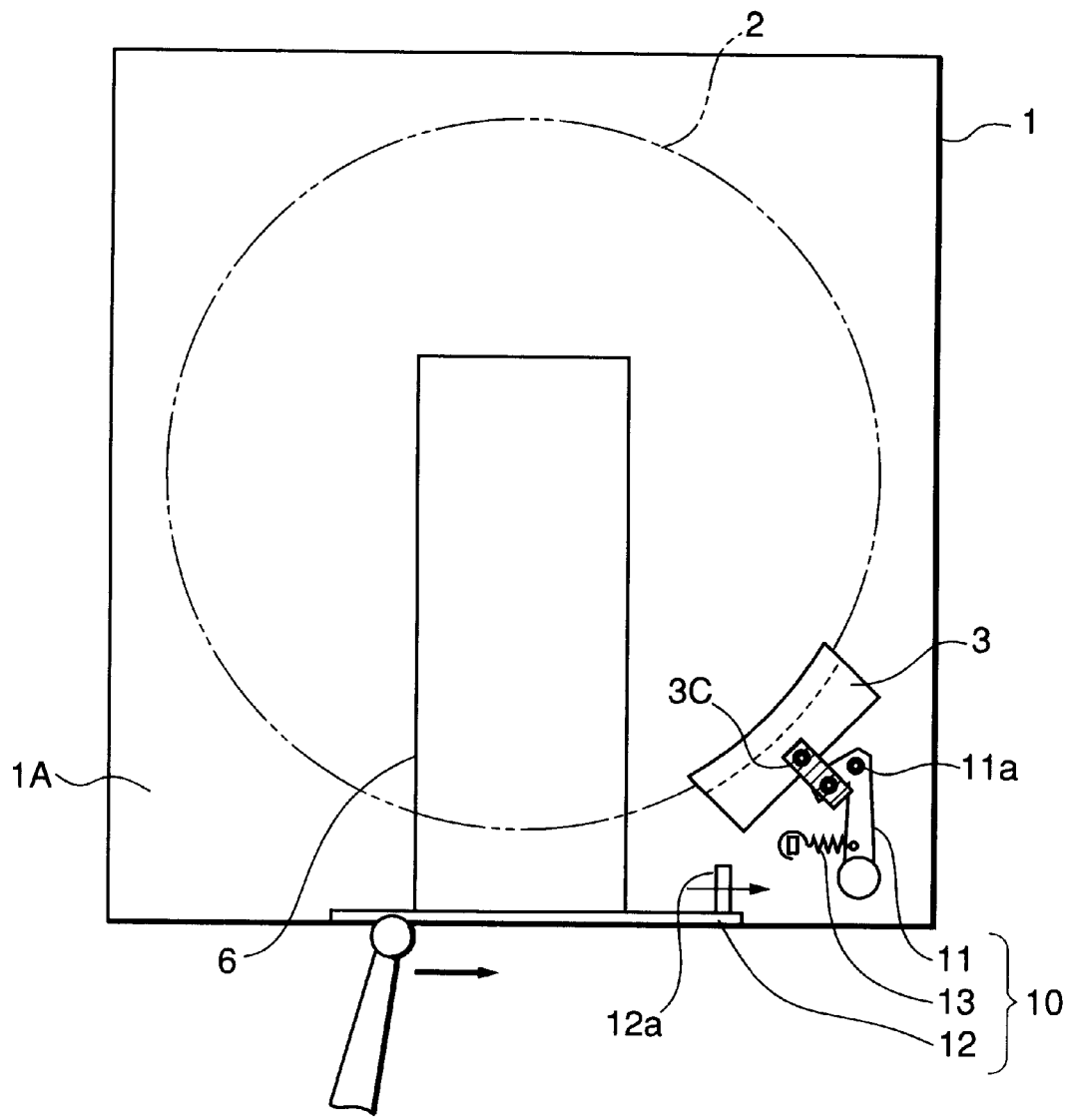
FIG. 1 shows a diagrammatic composition of a first example of this invention.
Figure 2:
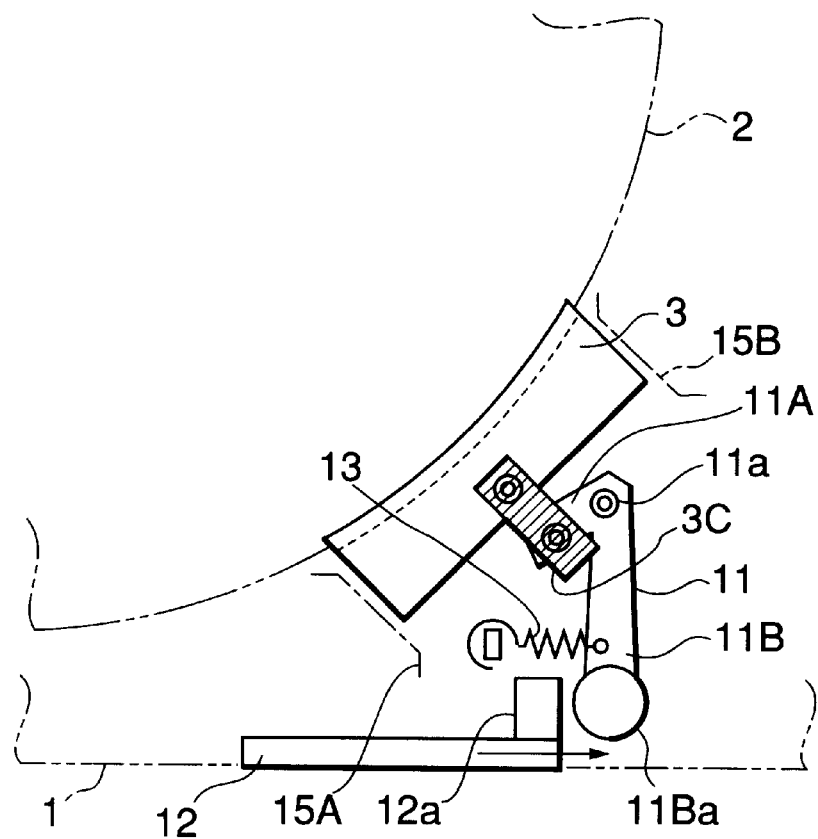
FIG. 2 is an enlarged illustration of parts of interest of the example depicted in FIG. 1.

Firstly turn to FIGS. 1 and 2 for reference. A mark 1 represents a cartridge storing a disk 2 or a recording medium.

This cartridge 1 contains the aforementioned spacer member 3 therein which is placed close to the rim of the disk 2, to gently hold the rim of disk 2. Further, to the spacer member 3 is connected a spacer releasing mechanism 10 which displaces the spacer member 3 away from the disk 2 in a radial direction of the disk 2 after being activated by a lever 4 for shutter opening/closure when the apparatus is put into action.

Next, the spacer releasing mechanism 10 is composed of a pivot lever 11 which acts to displace the spacer member 3 away from the disk 2 by engaging with the aforementioned spacer member 3, a shutter lever 12 which transmits a driving force from the aforementioned lever 4 for shutter opening/closure to the pivot lever 11, and an original position recovering spring 13 which is connected to the aforementioned pivot lever 11.

A mark 6 represents the shutter. This shutter 6 is mounted to a window which allows an optical head to get close to the disk 2 when the apparatus is put to use. This shutter 6 is opened and closed through action of the lever 4 for shutter opening/closure each time the cartridge 1 is inserted into or removed from the body of apparatus.

This operation will be described more in detail below.

Figure 3:
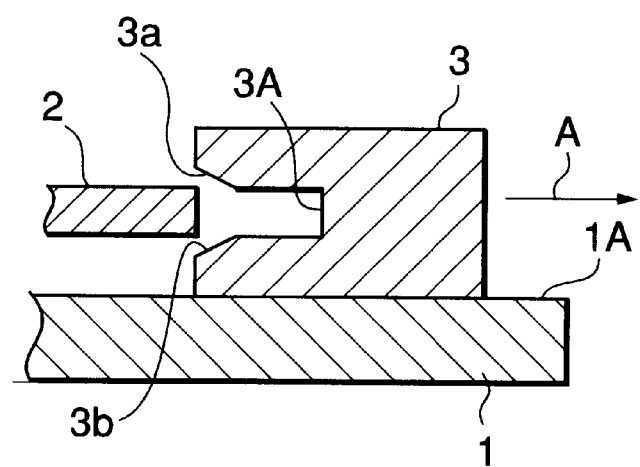
FIG. 3 is an illustration giving the operation of spacer member disclosed in the example depicted in FIG. 1.

The spacer member 3, as is shown in FIGS. 1 to 3, has a thickness about four times that of disk 2, and has a rectangular form as large as to contain about 1/12 sector of the circumference of disk 2. This spacer member 3 has, on its lateral surface opposite to the disk 2, a groove 3A in the shape of a rectangular indent which acts as a holder of disk. Marks 3a and 3b represent rounded-off edges of the disk holding groove 3A.

Through guide of those rounded-off edges, the rim of disk 2 can easily engage with the disk holding groove 3A of spacer member 2 while the apparatus is put out of use.

The pivot lever 11 or a principal element of the spacer releasing mechanism 10 is made of a V-shaped lever member whose one arm (short arm 11A) is made shorter than the other (long arm 11B). The angle between the two arms has a pivot 11a.

In addition, to the tip of this short arm 11A is connected the spacer member 3 by way of a connecting strip 3C. The two ends of this connecting strip 3C are connected to the center of rear edge of spacer member 3 and to the tip of short arm 11A respectively, to be freely rotatable around the connections. Marks 15A and 15B represent fixed guides to guide movement of the spacer member 3.

The aforementioned long arm 11B of pivot lever 11 is so placed as to project in the same side with that of shutter bar 12 as is seen from FIGS. 1 and 2, and has an engaging projection 11Ba at its tip. With this engaging projection 11Ba, engages a driving projection 12a projecting from the tip of aforementioned shutter bar 12. Through this engagement, in association with movement of the shutter bar 12, a predetermined driving force is given to the aforementioned pivot lever 11.

The cartridge 1 for disk apparatus is to effectively protect the disk 2 from soil and damage caused by dust and fingerprints.

In appearance, the cartridge has a rectangular form close to a square of which the width is about the same with the diameter of disk 2 and the length is slightly longer than the width, because that form facilitates handling when the cartridge is loaded. In FIG. 1, just for illustration, the cartridge 1 is drawn to have a width considerably larger than the diameter of disk 2.

To illustrate the size of a cartridge 1, take a product available in the market ("PD" produced by Matsushita). It has a width of 126 mm, length of 150 mm and thickness of 8 mm, as compared with the diameter of disk being 120 mm.

The cartridge 1, as described above, has the shutter 6 which closes when the apparatus is out of use and opens when it is put to use. When the cartridge is loaded, a force is generated in such a way as to allow the lever 4 for shutter opening/closure to move in a direction (to open the shutter 6) normal to the direction along which the cartridge 1 is inserted.

Being driven by that force, the shutter 6 and shutter bar 12 act to open the window completely before loading of the cartridge is terminated.

Incidentally, the shutter 6 is so constructed as to remain at a position which allows a complete closure of the window, through a certain spring action when the lever 4 for shutter closure/opening is kept out of action while the apparatus remains inactivated.

In addition, the disk 2 has an alignment hole (not illustrated here) which acts as a fixing point for a turn table of a spindle motor when the cartridge is loaded. The alignment hole receives a spike (alignment section) prepared on the turn table and thus, the disk 2 is stably held at a position for rotation before the apparatus is put into action.

For the spike prepared on the turn table to be properly inserted into the alignment hole, the disk 2 has to be immobilized with a certain range in cartridge 1 at a plane normal to the rotation axis of disk. In addition, the rotation axis of disk has to be immobilized with a certain range in its position so that the disk may not mechanically interact with the optical head.

On the other hand, when put to use, the disk has to be completely displaced away and kept off from the cartridge because it rotates at a high speed during operation. Therefore, a clearance with a predetermined distance is necessary from the position the disk takes during operation, in the direction of rotation axis of the disk and uniformly over the plane normal to the rotation axis. Cartridges available in the market have a clearance of about 1 mm at minimum, which is the same with that of this example.

FIG. 3 illustrates relative positions of the spacer member 3, disk 2 and cartridge base 1A of the example of this invention.

During operation, the disk 2 and spacer member 3 are separated from each other, but while operation is discontinued, the disk 2 is supported by the spacer member 3.

Figure 10A:
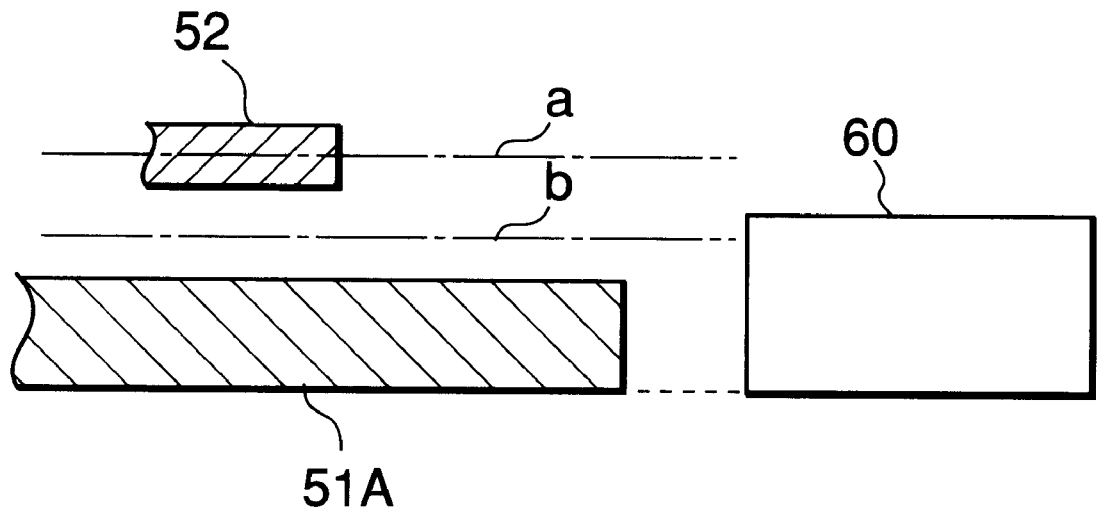
FIGS. 10A and 10B are an illustration to show how a disk is placed in the conventional example.
Figure 10B:
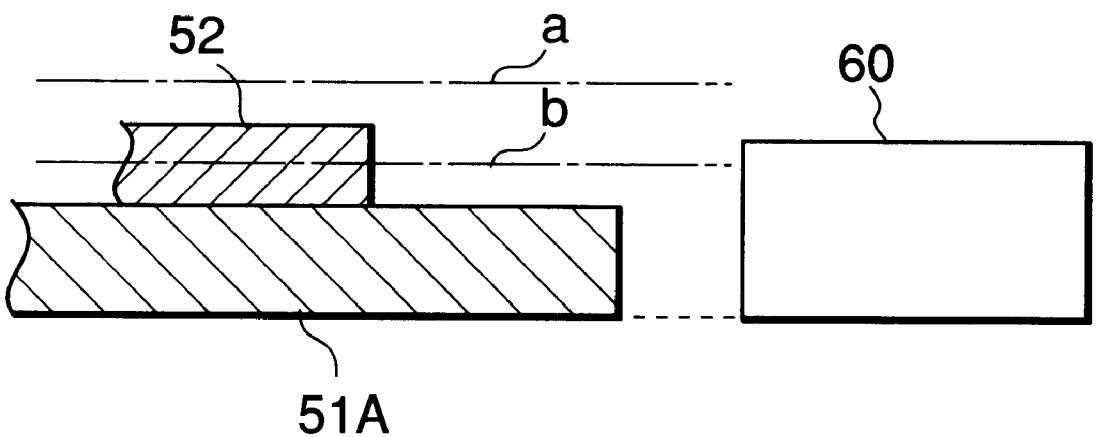

Further, when the cartridge 1 is loaded and the disk 2 is released from the space member 3, the disk 2 takes a position "a" (as shown in FIG. 10A), being elevated through a supportive action from the spindle motor, which will not interfere with the optical head, instead of a position "b" as shown in FIG. 10B as is the case with the conventional cartridge Next, above operation of this example will be described on the basis of FIGS. 2 to 6.

Firstly, when the cartridge 1 is inserted into the body of apparatus, during operation, the lever 4 for shutter opening/closure is activated, to put the shutter 6 and the spacer releasing mechanism 10 into action. Through this action, at the same time when the shutter 6 is opened, the shutter bar 12 of spacer releasing mechanism 10 is activated to spin the aforementioned pivot lever 11 thereby to allow the spacer member 3 to retreat from the disk in a direction as indicated by arrows A in FIGS. 3 and 4.

In this operation, FIG. 2 shows a state where the driving projection 12a at the tip of shutter bar 12 gets close to but does not contact with the engaging projection 11Ba at the tip of V-shaped lever member (pivot lever 11). In FIGS. 2 and 3, arrows A indicate the direction along which the spacer member 3 moves. Movement of this spacer member 3 smoothly takes place thanks to the guide of fixed guides 15A and 15B.

Figure 4:
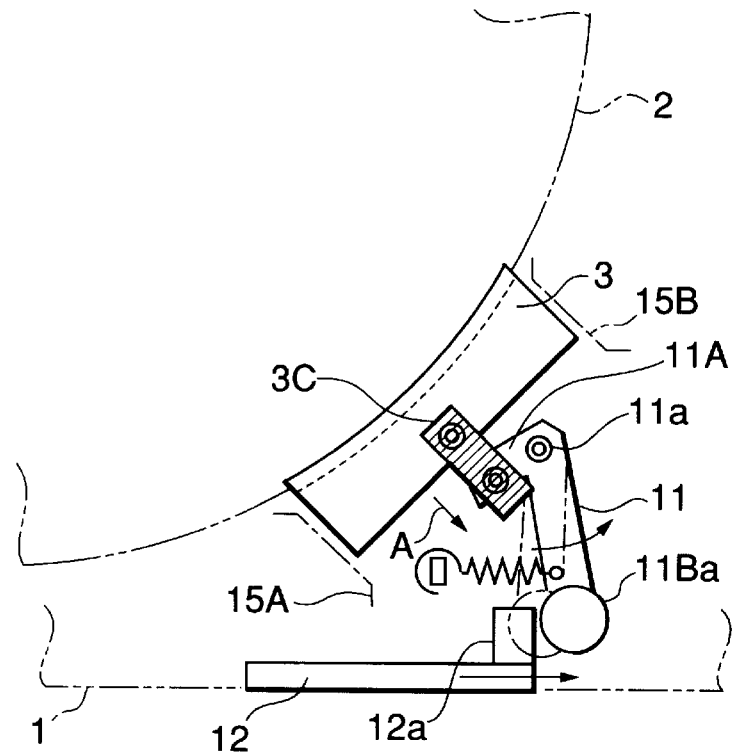
FIG. 4 is an illustration giving the operation of the example depicted in FIG. 1 where the shutter bar has just contacted with the pivot lever.

FIG. 4 shows another state where the driving projection 12a at the tip of shutter bar 12 has just engaged with the engaging projection 11Ba at the tip of V-shaped lever member (pivot member 11). At this state, the pivot lever 11 starts to spin round the pivot 11a.

Figure 5:
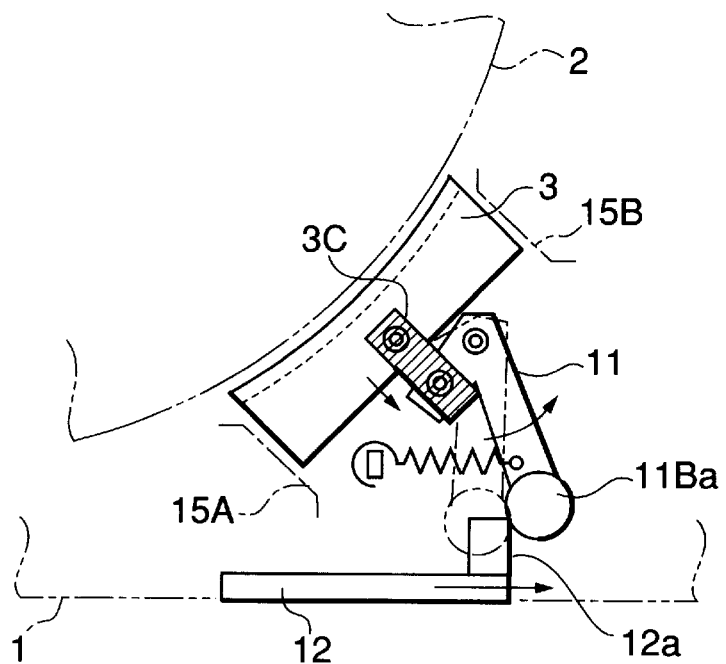
FIG. 5 is an illustration giving the operation of the example depicted in FIG. 1 where the spacer member is displaced away from the disk through action from the shutter bar.

FIG. 5 shows a third state where the driving projection 12a at the tip of shutter bar 12 pushes a certain distance the engaging projection 11Ba of V-shaped lever member (pivot lever 11). For either of the states depicted in FIGS. 4 and 5, the spacer member 3 is separated from the disk 2, and thus the disk 2 is released from the restriction imposed by the spacer member 3 while taking a position ready for rotation.

To be more specific, while the cartridge is being loaded, the turn table to support the disk 2 during operation is elevated, and just before the turn table starting to support the disk 2, the driving projection 12a of shutter bar 12 begins to engage with the engaging projection 11Ba of pivot lever 11 (see FIG. 2). Then, while loading is further advanced, the turn table firmly supports the disk 2, and the spacer releasing mechanism 3 releases the disk 2 from its fastening to the spacer member 3. FIG. 4 shows the state just described here.

When loading is still further advanced, a clearance sufficiently wide is established between the outer rim of disk 2 and the spacer member 3 to allow a free rotation of the disk. This state is shown in FIG. 5.

When operation of the body of apparatus is completed, and the cartridge 1 is taken out from the body of apparatus, in association with retreat of the shutter bar 12, the aforementioned original position recovering spring 13 is activated, to return the spacer member 3 to the original position as depicted in FIG. 1.

As discussed above, the first example of this invention is so constructed as to displace the spacer member 3 by way of the pivot lever 11, and hence the spacer member 3 can effectively exerts its function even when it is removed far from the shutter bar 12. Further, the moving distance of spacer member 3 can be determined by the ratio between the short and long arm lengths as measured from the pivot 11a of the pivot lever 11, which allows a wide applicability because the distance can be varied according to a given requirement.

As described in detail above, the first example of this invention makes it possible to obtain a disk supporting device adapted for an optical disk cartridge in which a disk does not change its position whether the apparatus is put to use or out of use. By virtue of this feature, this example of this invention is advantageous making it possible to prepare a uniformly thin cartridge for optical disk therefrom and thus to produce a small and durable optical disk apparatus therefrom.

Example 2

Next, a second example of this invention will be described below on the basis of FIGS. 6 and 7.

Figure 6:
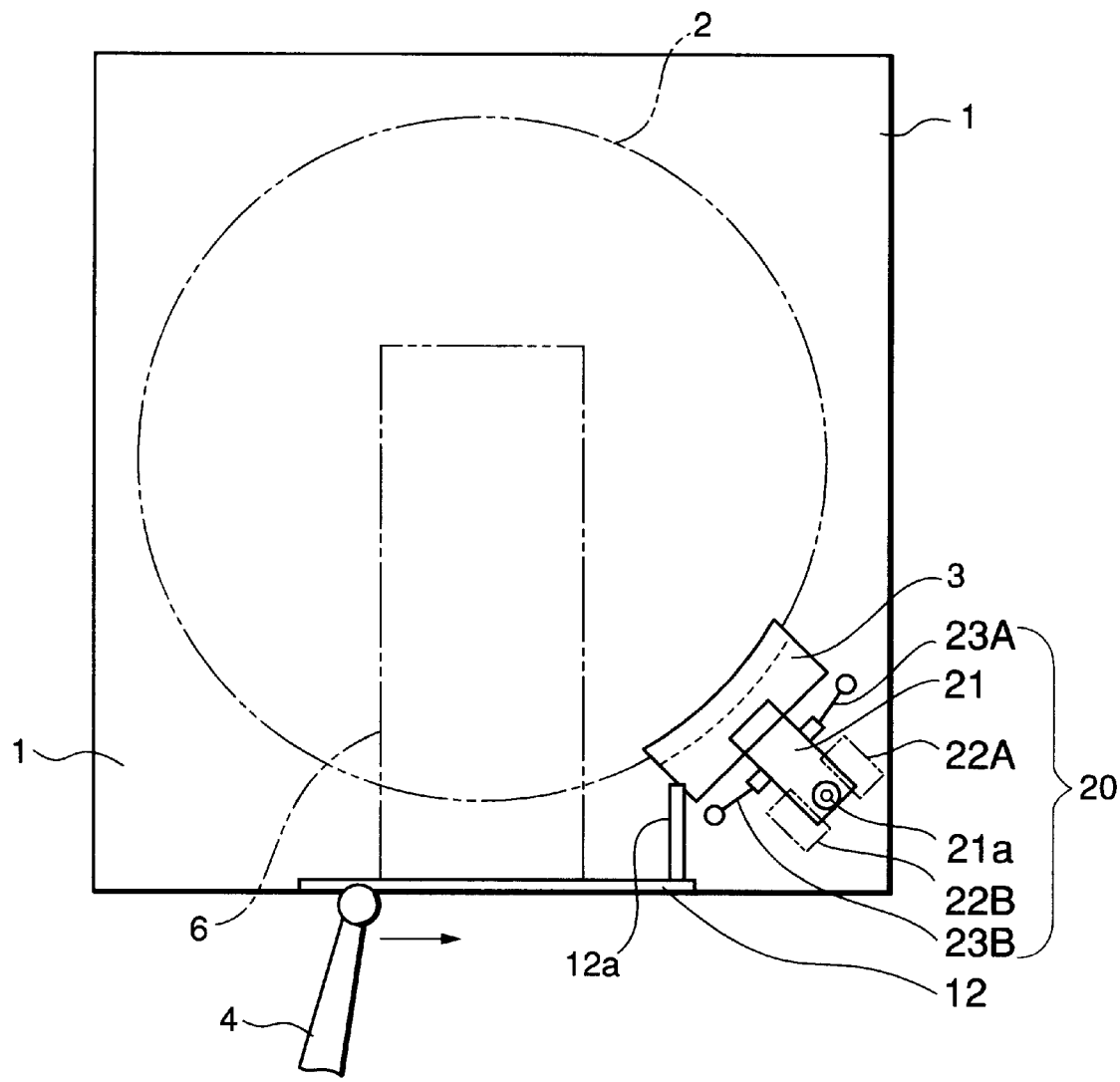
FIG. 6 shows a diagrammatic composition of a second example of this invention.
Figure 7:
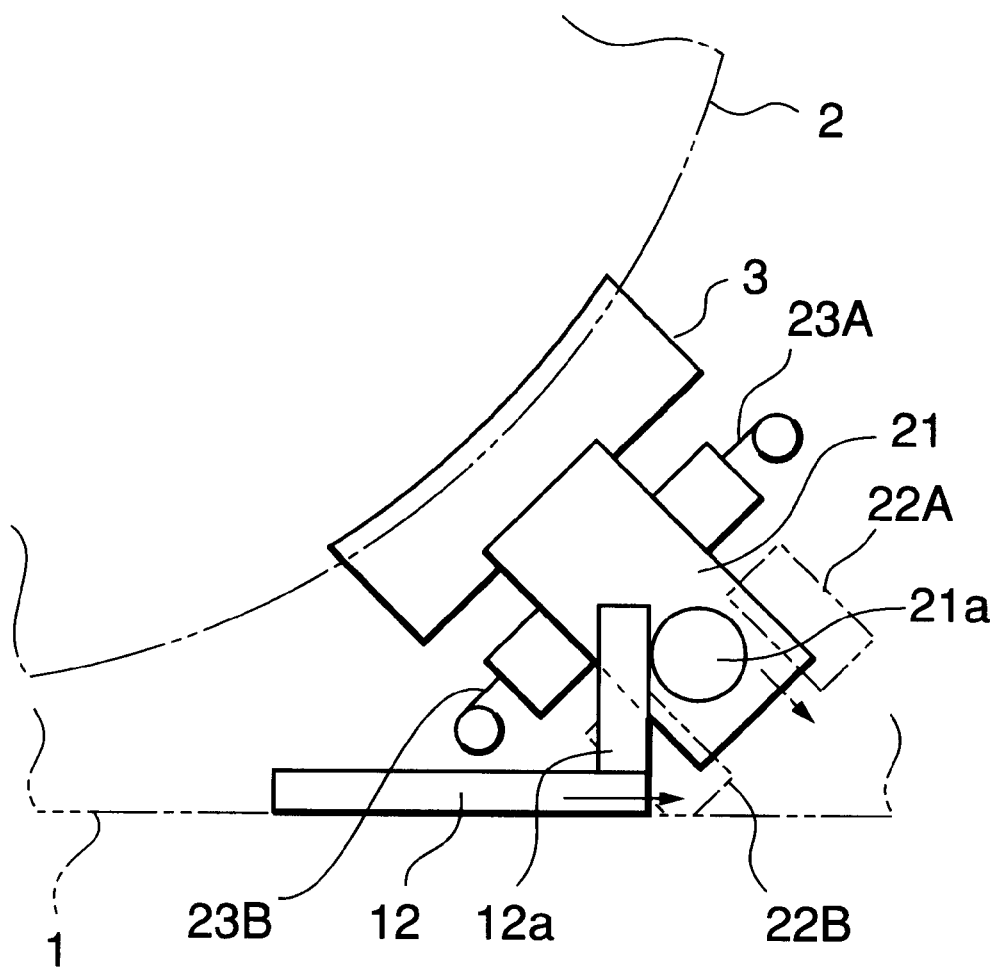
FIG. 7 is an illustration giving the operation of the example depicted in FIG. 6.
Figure 8:
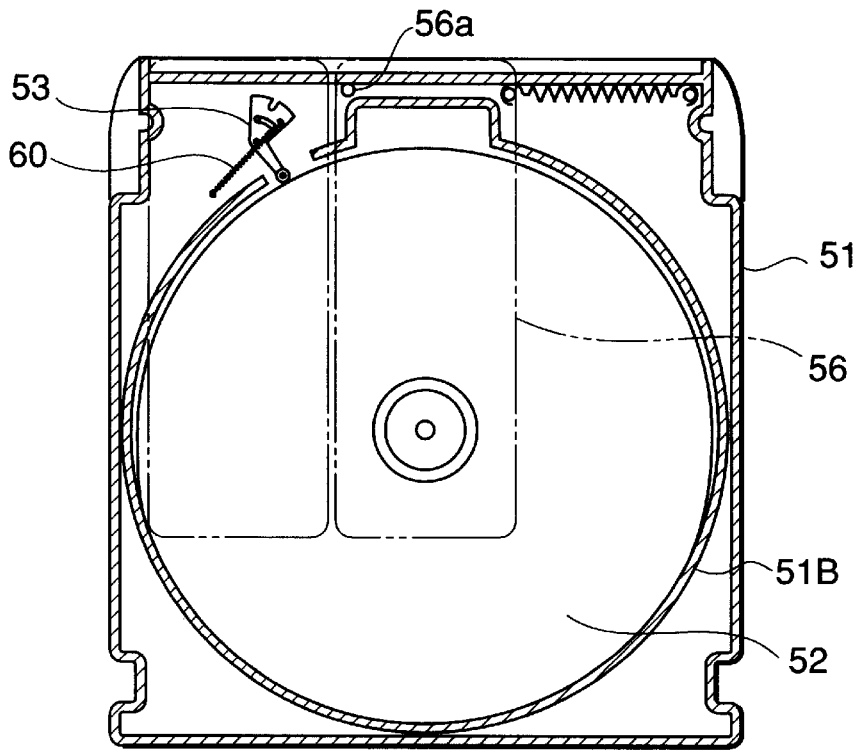
FIG. 8 is an illustration of a conventional example.
Figure 9:
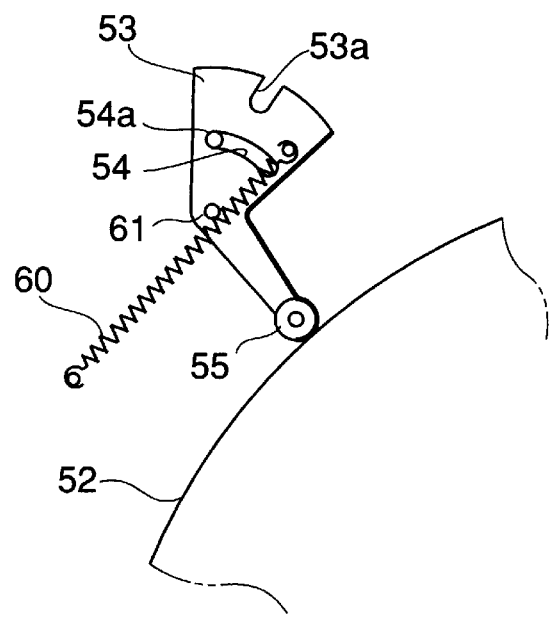
FIG. 9 is an illustration giving the operation of the conventional example depicted in FIG. 8.

The second example depicted in FIGS. 6 and 7 is characterized in that, in contrast with the first example where the shutter bar 12 transmits a driving force by way of the pivot lever 11 to the spacer member 3, the driving force from the shutter bar 12 is directly transmitted to the spacer member 3.

Namely, in this second example, a spacer releasing mechanism 20 is composed of a spacer holding member 21 which is fixed on one end at the center of rear end of spacer member 3, guide members 22A and 22B which guide movement of the spacer holding member 21 when the latter is displaced away from a disk 2 along a radial direction of the disk 2, a shutter bar 12 which transmits a driving force from a lever 4 for shutter opening/closure to the spacer holding member 21, and original position recovering springs 23A and 23B which are connected to the spacer holding member 21.

The spacer holding member 21 is made of a strip of material with a relatively large width, and is fixed to the spacer member 3 as if it were extended from the center of rear end of spacer member 3 outward in a radial direction of the disk 2. The spacer holding member 21 has an engaging projection 21a on the opposite end. With this engaging projection 21a engages the aforementioned driving projection 12a projecting from the tip of shutter bar 12, and, when the shutter bar 12 moves, a predetermined driving force is transmitted through the engagement to the spacer holding member 21 (and to the spacer member 3 united with the spacer holding member).

Further, the original position recovering springs 23A and 23B are placed symmetrically on both sides of the aforementioned spacer holding member 21 with a good balance.

For the composition of other elements, this example is the same with the first example.

Next, operation of the second example will be described below.

In FIG. 6, when the driving projection 12a of shutter bar 12 comes into contact with the engaging projection 21a of spacer holding member 21, thereby to transmit the driving force to the latter, in association with the movement of shutter bar 12, the spacer holding member 21 (and the spacer member 3) is displaced so as to be further away from the center of disk 2 being guided by the guide members 22A and 22B and resisting the counteraction from the original position recovering springs 23A and 23B.

During this operation, as in the first example described above, a brief pause is interposed before the lever 4 for shutter opening/closure contacts with the spacer holding member after it has come into contact with the shutter lever 4.

When loading of the cartridge is further advanced, a turn table to support the disk 2 during operation is elevated, just before the turn table starting to support the disk 2, the shutter bar 12 begins to engage with the engaging projection 21a of spacer holding member 21. FIG. 6 shows a state preceding above operation.

Then, while loading is further advanced, the turn table firmly supports the disk 2, and the spacer holding member 21 is displaced, and the disk 2 is released from its fastening as shown in FIG. 7.

When loading is still further advanced, the aforementioned clearance sufficiently wide is produced between the outer rim of disk 2 and the spacer member 3 to allow a smooth rotation of the disk 2.

With this constitution, it is also possible to obtain the same effect as in the first example described above. This example makes it possible to reduce the number of necessary elements, and the moving distance of spacer member 3 can be simply determined by appropriately adjusting the angle between the direction along which the shutter bar 12 moves and the direction along which the spacer member 3 moves. This is helpful for improving productivity.

As described in detail above, this invention makes it possible to obtain a disk supporting device adapted for an optical disk cartridge in which a disk does not change its position whether the apparatus is put to use or out of use. By virtue of this feature, this invention is advantageous making it possible to prepare a uniformly thin cartridge for optical disk. Thus, when it is put into practice, a cartridge with a disk supporting device allowing an excellent productivity never attainable by conventional devices can be obtained, where interactions between an optical head and disk as often occur with conventional cartridges during loading of the optical disk cartridge can be effectively eliminated.

While this invention has been described with reference to illustrate embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A disk supporting device stored in a cartridge comprising:
   a spacer member which is placed close to the rim of a disk placed within the cartridge, and gently holds the rim of the disk stationary in both an axial and a planar direction while the apparatus is put out of use; and
   a spacer releasing mechanism which, when the apparatus is put to use, is activated by a lever for opening and closing a shutter placed outside the cartridge, to displace the spacer member away from the disk in a radial direction of the disk to separate the former from the latter, with the spacer member having a groove in the form of a rectangular indent on a side opposite to the disk for holding the latter to prevent axial and planar movements of the disk.

2. A disk supporting device as described in claim 1 wherein the spacer releasing mechanism comprises:
   a pivot lever which engages with the spacer member to displace the latter away from the disk;
   a shutter bar which transmits a driving force from the lever for shutter opening and closure to the pivot lever; and
   an original position recovering spring which is connected to the pivot lever.

3. A magnetic head supporting device as described in claim 1 wherein the spacer releasing mechanism comprises:
   a spacer holding member which holds the spacer member by engaging with the spacer member;
   a guide member which guides the spacer holding member to remove it away from the disk along a radial direction of the disk;
   a shutter bar which transmits a driving force from the lever for shutter opening and closure to the spacer holding member; and
   an original position recovering spring which is connected to the spacer holding member.

4. A disk supporting device stored in a cartridge comprising:
   a disk holding means for gently holding the rim of a disk stationary in both an axial and a planar direction while the apparatus is put out of use, which is placed close to the rim of the disk placed within the cartridge; and
   a spacer releasing means for displacing the disk holding means away from the disk in a radial direction of the disk to separate the former from the latter, with the disk holding means having a groove in the form of a rectangular indent on a side opposite to the disk for holding the latter to prevent axial and planar movements of the disk, which, when the apparatus is put to use, is activated by a lever for opening and closing a shutter placed outside the cartridge.

5. A disk holding device as described in claim 2, wherein:
   the pivot lever is made of a V-shaped lever member comprising one arm with shorter sides and the other with longer sides, and a pivot at an elbow of the two arms;

the spacer member is connected via a connecting strip to the pivot lever;
   the center of the rear end of the sp acer member is connected freely rotatable to one end of the connecting strip;
   the tip of the short arm is c onnected freely rotatable to the other end of the connecting strip;
   the tip of the long arm has an engaging projection; and
   a driving projection protruding from the tip of the shutter bar engages with the engaging projection thereby giving a spinning force to the pivot lever.

6. A disk supporting device as described in claim 3 wherein:
   the spacer holding member has one end fixed to the spacer member as if it were extended from the center of rear end of spacer member outward in a radial direction of disk;
   the spacer holding member has an engaging projection on the other end; and
   a driving projection protruding from the tip of shutter bar engages with the engaging projection thereby giving a moving force to the spacer holding member in association with the movement of shutter bar.

7. A disk supporting device stored in a cartridge comprising:
   a spacer member which is placed close to the rim of a disk placed within the cartridge, and gently holds the rim of the disk while the apparatus is put out of use; and
   a spacer releasing mechanism which, when the apparatus is put to use, is activated by a lever for opening and closing a shutter placed outside the cartridge, to displace the spacer member away from the disk in a radial direction of the disk to separate the former from the latter, with the spacer member having a groove in the form of a rectangular indent on a side opposite to the disk for holding the latter,
   the spacer releasing mechanism comprising a pivot lever which engages with the spacer member to displace the latter away from the disk;
   a shutter bar which transmits a driving force from the lever for shutter opening and closure to the pivot lever; and
   an original position recovering spring which is connected to the pivot lever,
   the pivot lever comprising a V-shaped member with two arms,
   one arm with shorter sides and the other arm with longer sides, and a pivot at an elbow of the two arms;
   the spacer member being connected via a connecting strip to the pivot lever;
   the center of the rear end of the spacer member being connected freely rotatable to one end of the connecting strip;
   the tip of the short arm being connected freely rotatable to the other end of the connecting strip;
   the tip of the long arm having an engaging projection; and
   a driving projection protruding from the tip of the shutter bar engaging with the engaging projection thereby giving a spinning force to the pivot lever.

* * * * *

EX PARTE REEXAMINATION CERTIFICATE (4939th)
United States Patent
Iwazawa

(10) Number: US 5,995,482 C1
(45) Certificate Issued: May 18, 2004

(54) DISK SUPPORTING DEVICE CAPABLE OF HOLDING A DISK IN A CARTRIDGE WITH A RELEASABLE, PIVOTABLE LEVER ARM

(75) Inventor: Naotoshi Iwazawa, Tokyo (JP)

(73) Assignee: NEC Corporation, Tokyo (JP)

Reexamination Request:
No. 90/006,181, Jan. 8, 2002

Reexamination Certificate for:
Patent No.: 5,995,482
Issued: Nov. 30, 1999
Appl. No.: 09/008,324
Filed: Jan. 20, 1998

(30) Foreign Application Priority Data

Jan. 22, 1997 (JP) .............................................. 9-009654

(51) Int. Cl.$^7$ ................................................. G11B 3/70
(52) U.S. Cl. ....................................... 369/291; 369/261
(58) Field of Search ................................. 369/289, 290, 369/291, 215, 261; 360/133

(56) References Cited

U.S. PATENT DOCUMENTS

| | | | | |
|---|---|---|---|---|
| 3,529,301 A | * | 9/1970 | Hiruta | 360/133 |
| 4,433,410 A | * | 2/1984 | Siryj et al. | 206/313 |
| 4,692,831 A | * | 9/1987 | Suzuki | 360/133 |
| 4,773,061 A | * | 9/1988 | Stark et al. | 206/308.3 |
| 4,928,271 A | * | 5/1990 | Verhagen | 369/273 |
| 5,499,233 A | * | 3/1996 | Childers et al. | 360/133 |

FOREIGN PATENT DOCUMENTS

JP  4-20677  2/1992

OTHER PUBLICATIONS

Japanese Office Action, Sep. 28, 1999.

* cited by examiner

*Primary Examiner*—David L. Ometz

(57) ABSTRACT

A disk supporting device has a spacer member which is placed close to the rim of a disk stored within a cartridge, and gently holds the rim of disk while the apparatus is put out of use; and a spacer releasing mechanism which, when the apparatus is put to use, is activated by a lever for opening/closing a shutter placed outside the cartridge, to displace the spacer member away from the disk in a radial direction of disk to separate the former from the latter. Further, the spacer member is so formed as to have a groove in the form of a rectangular indent on a side opposite to the disk for holding the latter. Through this constitution it is possible to obtain a disk supporting device which does not change its position with respect to the cartridge base whether the apparatus is put to use or out of use, and to produce a cartridge on the whole uniformly thin and allowing a good productivity.

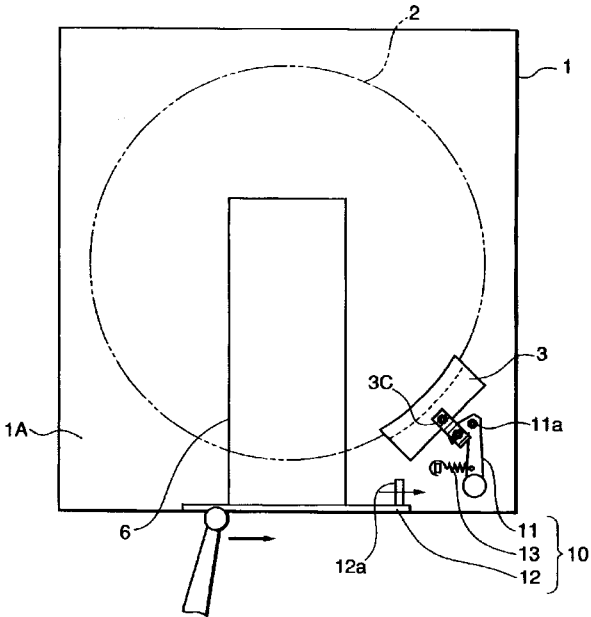

DIRECTION OF CARTRIDGE INSERTION

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5–7 is confirmed.

Claims 1–3 and 4 are cancelled.

\* \* \* \* \*